United States Patent
Lin et al.

(10) Patent No.: US 12,456,525 B2
(45) Date of Patent: Oct. 28, 2025

(54) THREE-DIMENSIONAL MEMORY DEVICE

(71) Applicant: MACRONIX INTERNATIONAL CO., LTD., Hsinchu (TW)

(72) Inventors: Yu-Hsuan Lin, Taichung (TW); Yu-Yu Lin, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 134 days.

(21) Appl. No.: 18/435,030

(22) Filed: Feb. 7, 2024

(65) Prior Publication Data

US 2025/0253000 A1    Aug. 7, 2025

(51) Int. Cl.
     *G11C 7/00*        (2006.01)
     *G06N 3/04*        (2023.01)
     *G11C 16/08*      (2006.01)
     *G11C 16/24*      (2006.01)
     *G11C 16/26*      (2006.01)

(52) U.S. Cl.
     CPC ............... *G11C 16/26* (2013.01); *G06N 3/04* (2013.01); *G11C 16/08* (2013.01); *G11C 16/24* (2013.01)

(58) Field of Classification Search
     CPC ....... G11C 7/1051; G11C 7/22; G11C 7/1072; G11C 7/1006; G11C 7/1066
     USPC .................................................... 365/189.15
     See application file for complete search history.

(56) References Cited

U.S. PATENT DOCUMENTS

| | | | |
|---|---|---|---|
| 10,552,510 B2 | 2/2020 | Bayat | |
| 10,825,510 B2 | 11/2020 | Jaiswal | |
| 11,094,376 B2 | 8/2021 | Grover | |
| 11,502,696 B2 | 11/2022 | Mathuriya | |
| 11,749,344 B2 * | 9/2023 | Harari | H10B 43/10 |
| | | | 365/163 |
| 2022/0358345 A1 | 11/2022 | Kim | |
| 2022/0398439 A1 * | 12/2022 | Zhang | G11C 16/10 |
| 2023/0395143 A1 | 12/2023 | Chen | |

FOREIGN PATENT DOCUMENTS

| | | |
|---|---|---|
| CN | 114388039 A | 4/2022 |
| TW | I704569 B | 9/2020 |
| TW | I787691 B | 12/2022 |
| TW | 202341150 A | 10/2023 |

* cited by examiner

*Primary Examiner* — Son T Dinh
(74) *Attorney, Agent, or Firm* — McClure, Qualey & Rodack, LLP

(57) ABSTRACT

A three-dimensional (3D) memory device comprising word lines, bit lines, a 3D memory array, encoding circuits and sensing circuits is provided in the present disclosure. The 3D memory array comprises two-dimensional (2D) memory arrays and stores first to fourth neural network data related to at least one neural network model. Each of the 2D memory arrays is coupled to the word lines and the bit lines, and is configured to receive first and second input voltages and output corresponding first and second output currents. The encoding circuits are respectively coupled to the 2D memory arrays and configured to generate the first and second input voltages respectively based on the first and second neural network data. The sensing circuits are respectively coupled to the 2D memory arrays and configured to generate the third and fourth neural network data respectively based on the first and second output currents.

20 Claims, 15 Drawing Sheets

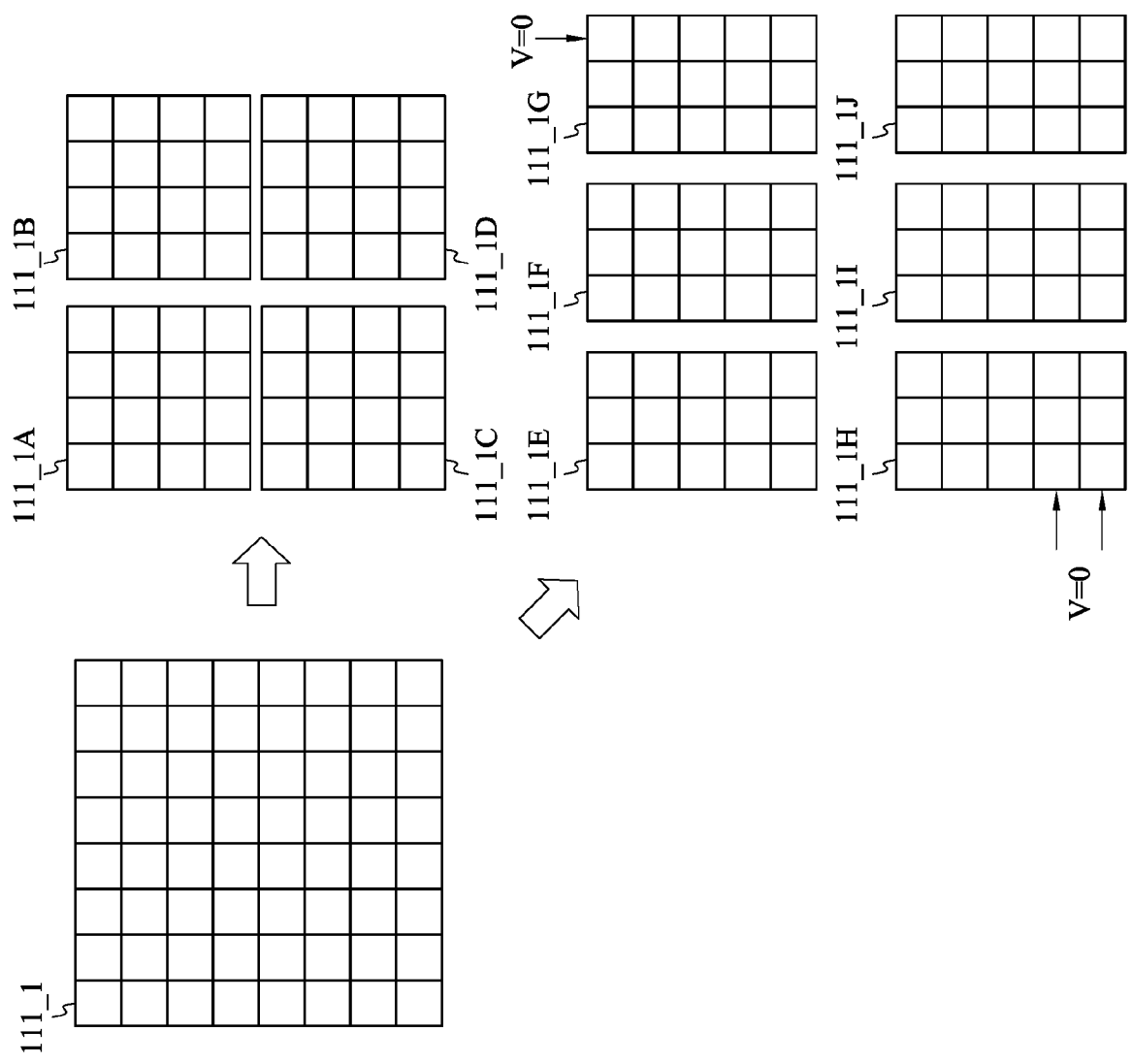

THREE-DIMENSIONAL MEMORY DEVICE

BACKGROUND

Technical Field

The present disclosure is related to the data storage technology in three-dimensional (3D) memory devices. More particularly, the present disclosure is related to 3D memory devices that transmit signals through two different signal paths to store twice the data.

Description of Related Art

With the development of memory technology, 3D memory device has gradually replaced traditional planar memory and is applied in various fields due to its lower unit cost. In addition, in order to alleviate the condition that the processor needs to spend a lot of time and power to read data from the memory, the in-memory computing technology has gradually attracted attention. With the in-memory computing (IMC) technology, computations can be directly performed in the memory, so as to enhance the speed and efficiency of reading data.

The 3D memory device has memory arrays comprising a large amount of memory cells, and each of the memory cells has a corresponding impedance. By adjusting the impedance of each of the memory cells, the 3D memory device can store the data (i.e., neurons) of the neural network model, so as to be applied in the artificial intelligence technology field.

However, with the development of artificial intelligence technology, the amount of data that needs to be stored during the calculation process is becoming larger and larger. Consequently, how to increase the data storage capacity of a 3D memory device for neural network models is one of the topics in this field.

SUMMARY

An aspect of a three-dimensional (3D) memory device is provided in the present disclosure. The 3D memory device comprises a plurality of word lines, a plurality of bit lines, a 3D memory array, a plurality of encoding circuits and a plurality of sensing circuits. The 3D memory array comprises a plurality of two-dimensional (2D) memory arrays, and is configured to store a first neural network data, a second neural network data, a third neural network data and a fourth neural network data related to at least one neural network model. Each of the plurality of 2D memory arrays is coupled to the plurality of word lines and the plurality of bit lines, configured to receive a first input voltage and output a first output current, and configured to receive a second input voltage and output a second output current. The plurality of encoding circuits are respectively coupled to the plurality of 2D memory arrays, and are configured to generate the first input voltage and the second input voltage respectively based on the first neural network data and the second neural network data. The plurality of sensing circuits are respectively coupled to the plurality of 2D memory arrays, and are configured to generate the third neural network data and the fourth neural network data respectively based on the first output current and the second output current.

In some embodiments of this aspect of the 3D memory device, the first neural network data is related to a $K^{th}$ neural network layer of a first neural network model of the at least one neural network model, the third neural network data is related to a $(K+1)^{th}$ neural network layer of the first neural network model, the second neural network data is related to a $M^{th}$ neural network layer of a second neural network model of the at least one neural network model, and the fourth neural network data is related to a $(M+1)^{th}$ neural network layer of the second neural network model. The first neural network model is different from the second neural network model, and M and K are positive integers.

In some embodiments of this aspect of the 3D memory device that store data related to different neural network models, a first 2D memory array of the plurality of 2D memory arrays is coupled to two of the plurality of sensing circuits, a second 2D memory array of the plurality of 2D memory arrays is coupled to two of the plurality of encoding circuits. The two of the plurality of sensing circuits are respectively coupled to the two of the plurality of encoding circuits, and are respectively configured to: input the third neural network data of the first 2D memory array to the second 2D memory array as the first neural network data of the second 2D memory array; and input the fourth neural network data of the first 2D memory array to the second 2D memory array as the second neural network data of the second 2D memory array.

In some embodiments of this aspect of the 3D memory device that store data related to different neural network models, the plurality of 2D memory arrays receive the first neural network data through the plurality of word lines, and receive the second neural network data through the plurality of bit lines. The plurality of 2D memory arrays transmit the third neural network data through the plurality of bit lines, and transmit the fourth neural network data through the plurality of word lines.

In some embodiments of this aspect of the 3D memory device that store data related to different neural network models, a part of the plurality of 2D memory arrays receive the first neural network data through the plurality of word lines, receive the second neural network data through the plurality of bit lines, transmit the third neural network data through the plurality of bit lines, and transmit the fourth neural network data through the plurality of word lines. The other part of the plurality of 2D memory arrays receive the first neural network data through the plurality of bit lines, receive the second neural network data through the plurality of word lines, transmit the third neural network data through the plurality of word lines, and transmit the fourth neural network data through the plurality of bit lines.

In some embodiments of this aspect of the 3D memory device, the first neural network data is related to a $K^{th}$ neural network layer of a first neural network model of the at least one neural network model, the second neural network data is same to the third neural network data and is related to a $(K+1)^{th}$ neural network layer of the first neural network model, and the fourth neural network data is related to a $(K+2)^{th}$ neural network layer of the first neural network model, wherein K is a positive integer.

In some embodiments of this aspect of the 3D memory device that store data related to the same neural network model, a first 2D memory array of the plurality of 2D memory arrays is coupled to a first sensing circuit and a second sensing circuit of the plurality of sensing circuits, and is coupled to a first encoding circuit and a second encoding circuit of the plurality of encoding circuits. The first encoding circuit is configured to receive the first neural network data. The first sensing circuit is coupled to the second encoding circuit, and is configured to transmit the third neural network data to the first 2D memory array as the second neural network data. The second sensing circuit is configured to transmit the fourth neural network data to a second 2D memory array of the plurality of 2D memory arrays as the first neural network data of the second 2D memory array.

In some embodiments of this aspect of the 3D memory device that store data related to the same neural network model, the plurality of 2D memory arrays receive the first neural network data through the plurality of word lines, and receive the second neural network data through the plurality of bit lines. The plurality of 2D memory arrays transmit the third neural network data through the plurality of bit lines, and transmit the fourth neural network data through the plurality of word lines.

In some embodiments of this aspect of the 3D memory device that store data related to the same neural network model, a part of the plurality of 2D memory arrays receive the first neural network data through the plurality of word lines, receive the second neural network data through the plurality of bit lines, transmit the third neural network data through the plurality of bit lines, and transmit the fourth neural network data through the plurality of word lines. The other part of the plurality of 2D memory arrays receive the first neural network data through the plurality of bit lines, receive the second neural network data through the plurality of word lines, transmit the third neural network data through the plurality of word lines, and transmit the fourth neural network data through the plurality of bit lines.

Another aspect of the three-dimensional (3D) memory device is provided in the present disclosure. The 3D memory device comprises a plurality of word lines, a plurality of bit lines, a 3D memory array, a plurality of encoding circuits and a plurality of sensing circuits. The 3D memory array comprises a plurality of two-dimensional (2D) memory arrays. Each of the plurality of 2D memory arrays comprises a plurality of sub-arrays with the same size, and is configured to store a first neural network data, a second neural network data, a third neural network data and a fourth neural network data related to at least one neural network model. The plurality of sub-arrays are coupled to the plurality of word lines and the plurality of bit lines, configured to receive a plurality of first input voltages and output a plurality of first output currents, and configured to receive a plurality of second input voltages and output a plurality of second output currents. The plurality of encoding circuits are respectively coupled to the plurality of sub-arrays, and are configured to generate the plurality of first input voltages and the plurality of second input voltages respectively based on the first neural network data and the second neural network data. The plurality of sensing circuits are respectively coupled to the plurality of sub-arrays, and are configured to generate the third neural network data and the fourth neural network data respectively based on the plurality of first output currents and the plurality of second output currents.

In some embodiments of the another aspect of the 3D memory device, the first neural network data is related to a $K^{th}$ neural network layer of a first neural network model of the at least one neural network model, the third neural network data is related to a $(K+1)^{th}$ neural network layer of the first neural network model. The second neural network data is related to a $M^{th}$ neural network layer of a second neural network model of the at least one neural network model, the fourth neural network data is related to a $(M+1)^{th}$ neural network layer of the second neural network model. The first neural network model is different from the second neural network model, and M and K are positive integers.

In some embodiments of the another aspect of the 3D memory device that store data related to different neural network models, each of a plurality of first sub-arrays of the plurality of sub-arrays is coupled to two of the plurality of sensing circuits, each of a plurality of second sub-arrays of the plurality of sub-arrays is coupled to two of the plurality of encoding circuits. The two of the plurality of sensing circuits that coupled to the plurality of first sub-arrays are coupled to the two of the plurality of encoding circuits that coupled to the plurality of second sub-arrays, and are respectively configured to: input the third neural network data of the plurality of first sub-arrays to the plurality of second sub-arrays as the first neural network data of the plurality of second sub-arrays; and input the fourth neural network data of the plurality of first sub-arrays to the plurality of second sub-arrays as the second neural network data of the plurality of second sub-arrays.

In some embodiments of the another aspect of the 3D memory device that store data related to different neural network models, the plurality of sub-arrays receive the first neural network data through the plurality of word lines, and receive the second neural network data through the plurality of bit lines. The plurality of sub-arrays transmit the third neural network data through the plurality of bit lines, and transmit the fourth neural network data through the plurality of word lines.

In some embodiments of the another aspect of the 3D memory device that store data related to different neural network models, a part of the plurality of sub-arrays receive the first neural network data through the plurality of word lines, receive the second neural network data through the plurality of bit lines, transmit the third neural network data through the plurality of bit lines, and transmit the fourth neural network data through the plurality of word lines. The other part of the plurality of sub-arrays receive the first neural network data through the plurality of bit lines, receive the second neural network data through the plurality of word lines, transmit the third neural network data through the plurality of word lines, and transmit the fourth neural network data through the plurality of bit lines.

In some embodiments of the another aspect of the 3D memory device, the first neural network data is related to a $K^{th}$ neural network layer of a first neural network model of the at least one neural network model, the second neural network data is same to the third neural network data and is related to a $(K+1)^{th}$ neural network layer of the first neural network model, and the fourth neural network data is related to a $(K+2)^{th}$ neural network layer of the first neural network model. K is a positive integer.

In some embodiments of the another aspect of the 3D memory device that store data related to the same neural network model, a plurality of first sub-arrays of the plurality of sub-arrays are coupled to a plurality of first sensing circuits and a plurality of second sensing circuits of the plurality of sensing circuits, and are coupled to a plurality of first encoding circuits and a plurality of second encoding circuits of the plurality of encoding circuits. The plurality of first encoding circuits are configured to receive the first neural network data. The plurality of first sensing circuits are coupled to the plurality of second encoding circuits, and are configured to transmit the third neural network data to the plurality of first sub-arrays as the second neural network data. The plurality of second sensing circuits are configured to transmit the fourth neural network data to a plurality of second sub-arrays of the plurality of sub-arrays as the first neural network data of the plurality of second sub-arrays.

In some embodiments of the another aspect of the 3D memory device that store data related to the same neural network model, the plurality of sub-arrays receive the first neural network data through the plurality of word lines, and receive the second neural network data through the plurality of bit lines. The plurality of sub-arrays transmit the third neural network data through the plurality of bit lines, and transmit the fourth neural network data through the plurality of word lines.

In some embodiments of the another aspect of the 3D memory device that store data related to the same neural network model, a part of the plurality of sub-arrays receive the first neural network data through the plurality of word lines, receive the second neural network data through the plurality of bit lines, transmit the third neural network data through the plurality of bit lines, and transmit the fourth neural network data through the plurality of word lines. The other part of the plurality of sub-arrays receive the first neural network data through the plurality of bit lines, receive the second neural network data through the plurality of word lines, transmit the third neural network data through the plurality of word lines, and transmit the fourth neural network data through the plurality of bit lines.

In some embodiments of the another aspect of the 3D memory device, the first neural network data, the second neural network data, the third neural network data and the fourth neural network data are different from each other, and are related to the same one neural network layer of one of the at least one neural network model.

In some embodiments of the another aspect of the 3D memory device that store data related to the same neural network layer of the same neural network model, the plurality of sub-arrays receive the first neural network data through the plurality of word lines, and receive the second neural network data through the plurality of bit lines. The plurality of sub-arrays transmit the third neural network data through the plurality of bit lines, and transmit the fourth neural network data through the plurality of word lines.

With the two aspects of 3D memory device in the present disclosure, signals can be transmitted in different directions in the memory array, so as to implement the function of storing two types of neural network data, thereby improving the storage capacity of the 3D memory device.

It should be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

FIG. 5 is a schematic diagram of the relationship between a 2D memory array and sub-arrays in accordance with some embodiments of the present disclosure.

DETAILED DESCRIPTION

Reference will now be made in detail to the present embodiments of the disclosure, examples of which are illustrated in the accompanying drawings.

In the present disclosure, when an element is referred to as "connected", it may mean "electrically connected" or "optical connected". When an element is referred to as "coupled", it may mean "electrically coupled" or "optical coupled". "Connected" or "coupled" can also be used to indicate that two or more components operate or interact with each other. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Figure 1:
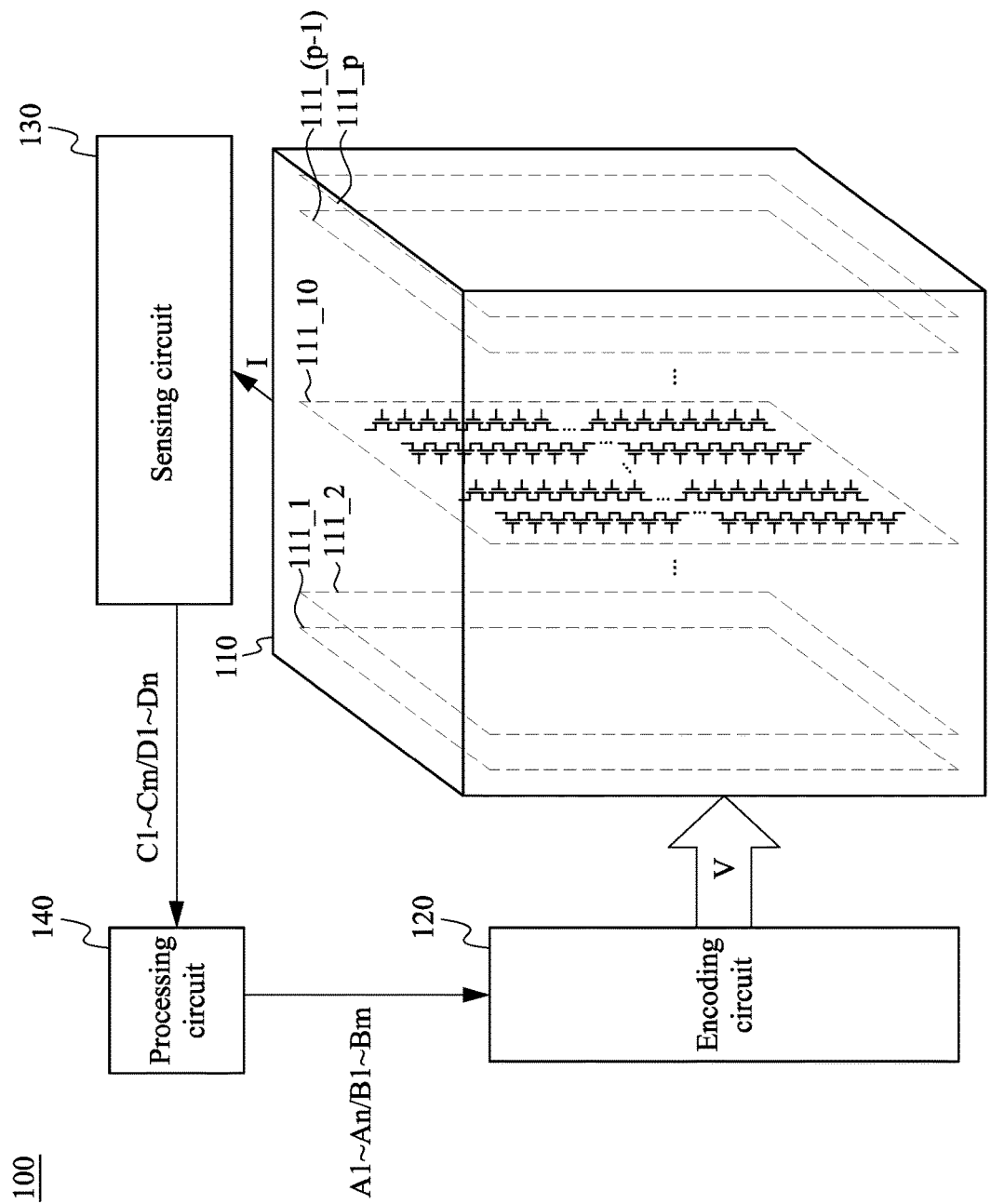
FIG. 1 is a three-dimensional (3D) schematic diagram of a 3D memory device in accordance with some embodiments of the present disclosure.

FIG. 1 is a three-dimensional (3D) schematic diagram of a 3D memory device 100 in accordance with some embodiments of the present disclosure. In some embodiments, the 3D memory device 100 comprises a 3D memory array 110, a plurality of encoding circuits 120, a plurality of sensing circuits 130, a plurality of processing circuits 140, word lines WL1-WLn and bit lines BL1-BLm. It should be noted that for the sake of brevity of the figure, the word lines WL1-WLn and the bit lines BL1-BLm are omitted in FIG. 1 (and will be shown and described in subsequent paragraphs and figures), and only one encoding circuit 120, one sensing circuit 130 and one processing circuit 140 are shown in FIG. 1.

The 3D memory array 110 is coupled between the encoding circuit 120 and the sensing circuit 130, and is configured to receive input voltages V from the encoding circuit 120 and transmit output currents I to the sensing circuit 130. In some embodiments, the 3D memory array 110 comprises two-dimensional (2D) memory arrays 111_1-111_p, wherein p is a positive integer. The planes of the 2D memory arrays 111_1-111_p extend along a plane direction (e.g., the plane direction formed by the directions X and Z in FIG. 1), and the 2D memory arrays 111_1-111_p are arranged along another specific direction (e.g., the direction Y in FIG. 1), so as to jointly form a 3D structure.

In some embodiments, the 3D memory array 110 may be implemented with a volatile memory (e.g., a dynamic random access memory (DRAM), a static random access memory (SRAM)), a non-volatile memory (e.g., a magnetoresistive random access memory (MRAM), a ferroelectric random access memory (FeRAM)) or a combination of the above components.

In some embodiments, each of the 2D memory arrays 111_1-111_p comprises a plurality of memory cells (e.g., a plurality of transistors illustrated in FIG. 1). The internal structure of these memory cells will be described in detail in subsequent paragraphs.

The encoding circuit 120 is coupled to the 2D memory arrays 111_1-111_p of the 3D memory array 110 and the processing circuit 140, and is configured to receive neural network data A1-An and B1-Bm from the processing circuit 140, and transmit the corresponding input voltages V, based on the neural network data A1-An and B1-Bm, to the 2D memory arrays 111_1-111_p.

The sensing circuit 130 is coupled to the 2D memory arrays 111_1-111_p of the 3D memory array 110 and the processing circuit 140, and is configured to receive the output currents I from the 2D memory arrays 111_1-111_p, calculate corresponding neural network data C1-Cm and D1-Dn based on the output currents I, and transmit the neural network data C1-Cm and D1-Dn to the processing circuit 140.

The processing circuit 140 is coupled to the encoding circuit 120 and the sensing circuit 130, and is configured to transmit the neural network data A1-An and B1-Bm to the encoding circuit 120 and receive the neural network data C1-Cm and D1-Dn from the sensing circuit 130.

Figure 2A:
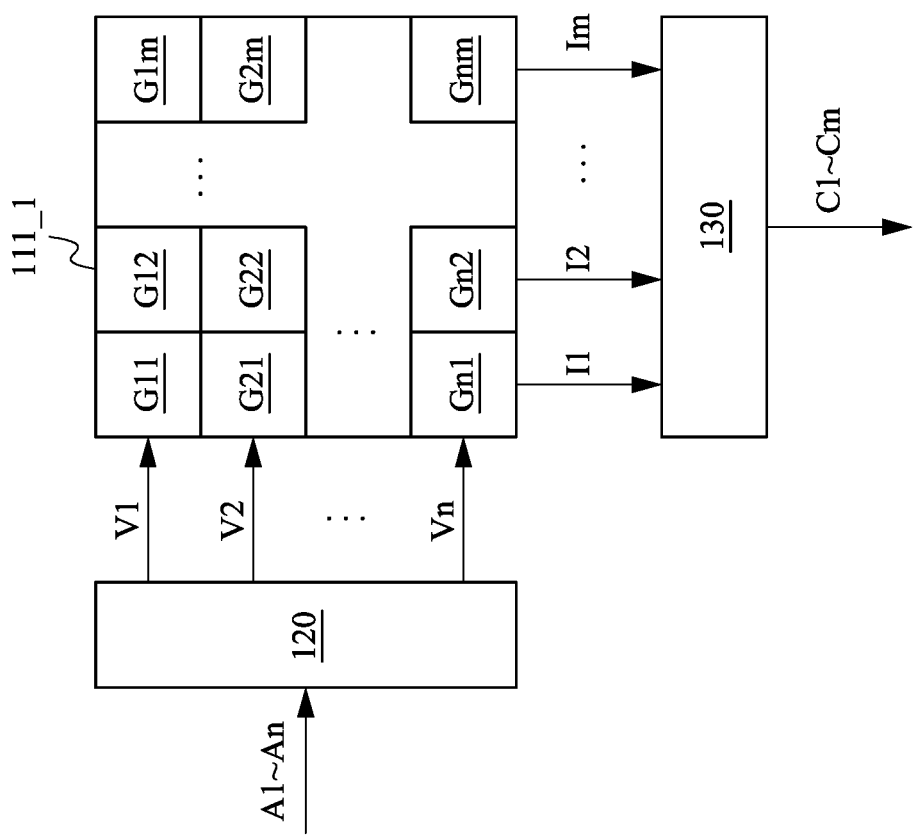
FIG. 2A is a schematic diagram of an encoding circuit, a sensing circuit and a plurality of two-dimensional (2D) memory arrays in accordance with some examples.

Since the 2D memory arrays 111_1-111_p are coupled to the encoding circuit 120 and the sensing circuit 130 in a similar manner, for the sake of brevity, only the connection relationship between the memory array 111_1, the encoding circuit 120 and the sensing circuit 130 will be described in subsequent paragraphs. FIG. 2A is a schematic diagram of the encoding circuit 120, the sensing circuit 130 and the 2D memory array 111_1 in accordance with some examples. In some embodiments, the 2D memory array 111_1 comprises memory cells G11-G1$m$, G21-G2$m$, . . . , Gn1-Gnm, and the memory cells G11-G1$m$, G21-G2$m$, . . . , Gn1-Gnm are arranged in an array with m column(s) and n row(s), wherein m and n are positive integers.

As shown in FIG. 2A, after receiving the neural network data A1-An, the encoding circuit 120 will generate corresponding input voltages V1-Vn to the 2D memory array 111_1 according to the neural network data A1~An. Next, the 2D memory array 111_1 generates output currents I1-Im to the sensing circuit 130. After receiving the output currents I1-Im, the sensing circuit 130 will generate the corresponding neural network data C1-Cm based on the output currents I1-Im.

Figure 2B:
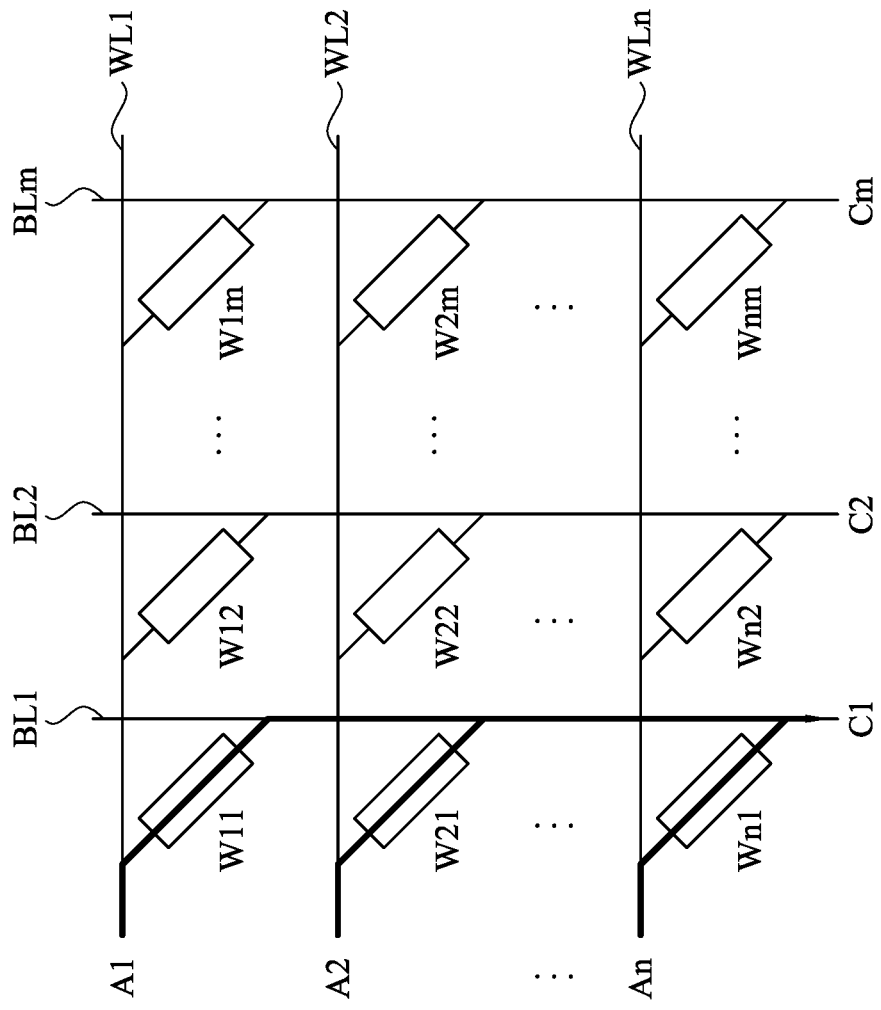
FIG. 2B is a schematic diagram of the internal structure and current path of a 2D memory array in accordance with some embodiments of the present disclosure.

For the internal structure and current path of the 2D memory array 111_1, please refer to FIG. 2B. FIG. 2B is a schematic diagram of the internal structure and current path of the 2D memory array 111_1 in accordance with some embodiments of the present disclosure.

In some embodiments, the memory cells G11-G1$m$, G21-G2$m$, . . . , Gn1-Gnm respectively have impedances W11-W1$m$, W21-W2$m$, . . . , Wn1-Wnm. Operationally, when the input voltages V1-Vn are inputted to the 2D memory array 111_1 through the word lines WL1-WLn respectively, the 2D memory array 111_1 will generate a part of the output current I1 on the bit line BL1 based on the input voltage V1 (corresponding to the neural network data A1) and the impedance W11 of the memory cell G11, generate another part of the output current I1 on the bit line BL1 based on the input voltage V2 (corresponding to the neural network data A2) and the impedance W21 of the memory cell G21, and so on. Consequently, the inputs of the input voltages V1-Vn (corresponding to the neural network data A1-An) will generate n parts of the output current I1 on the bit line BL1, and the sum of these n parts is the output current I1 (corresponding to the neural network data C1).

Similarly, the 2D memory array 111_1 will generate a part of the output current I2 on the bit line BL2 based on the input voltage V1 (corresponding to the neural network data A1) and the impedance W12 of the memory cell G12, generate another part of the output current I2 on the bit line BL2 based on the input voltage V2 (corresponding to the neural network data A2) and the impedance W22 of the memory cell G22, and so on. Consequently, the inputs of the input voltages V1-Vn (corresponding to the neural network data A1-An) will generate n parts of the output current I2 on the bit line BL2, and the sum of these n parts is the output current I2 (corresponding to the neural network data C2). The output currents I3-Im (corresponding to the neural network data C3-Cm) are generated in a manner similar to the output currents I1 and I2. For the sake of brevity, they will not be repeated here.

Figure 2C:
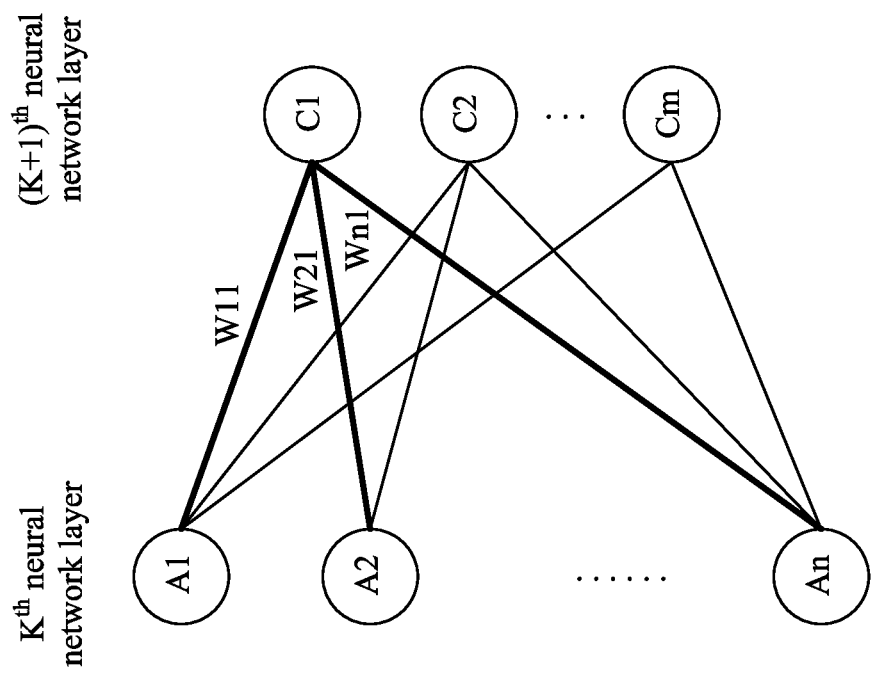
FIG. 2C is a schematic diagram of a neural network model in accordance with some embodiments of the present disclosure.

The relationship between the input voltages V1-Vn, the impedances W11-W1$m$, W21-W2$m$, . . . , Wn1-Wnm and the output currents I1-Im can be used to implement the calculation between two adjacent neural network layers of a neural network model. Please refer to FIG. 2B and FIG. 2C together. FIG. 2C is a schematic diagram of a neural network model in accordance with some embodiments of the present disclosure.

In the embodiment of FIG. 2C, the neural network data A1-An are stored in the neurons of the $K^{th}$ neural network layer, and the neural network data C1-Cm are stored in the neurons of the $(K+1)^{th}$ neural network layer. The neural network data of a neuron in the current layer is the sum of the neural network data of all neurons in the previous layer multiplied by corresponding weights. For example, in the embodiment of FIG. 2C, the neural network data C1 is the sum of the neural network data A1-An multiplied by the weights W11, W21, . . . , Wn1 respectively; the neural network data C2 is the sum of the neural network data A1-An multiplied by the weights W12, W22, . . . , Wn2 (not shown for the sake of brevity) respectively, and so on. Therefore, the calculation of the neural network data C1-Cm can be expressed as the following Formula 1:

$$Cj = \sum_{i=1}^{n} (Ai * Wij).\qquad \text{Formula 1}$$

Since the calculation methods for the neural network data C1-Cm in FIG. 2B and FIG. 2C are the same, the impedances W11, W21, ..., Wn1 in FIG. 2B can be regarded as implementing the weights W11, W21, ..., Wn1 of the neural network model in FIG. 2C, thereby implementing the function of storing the neural network data of the $K^{th}$ neural network layer.

Figure 2D:
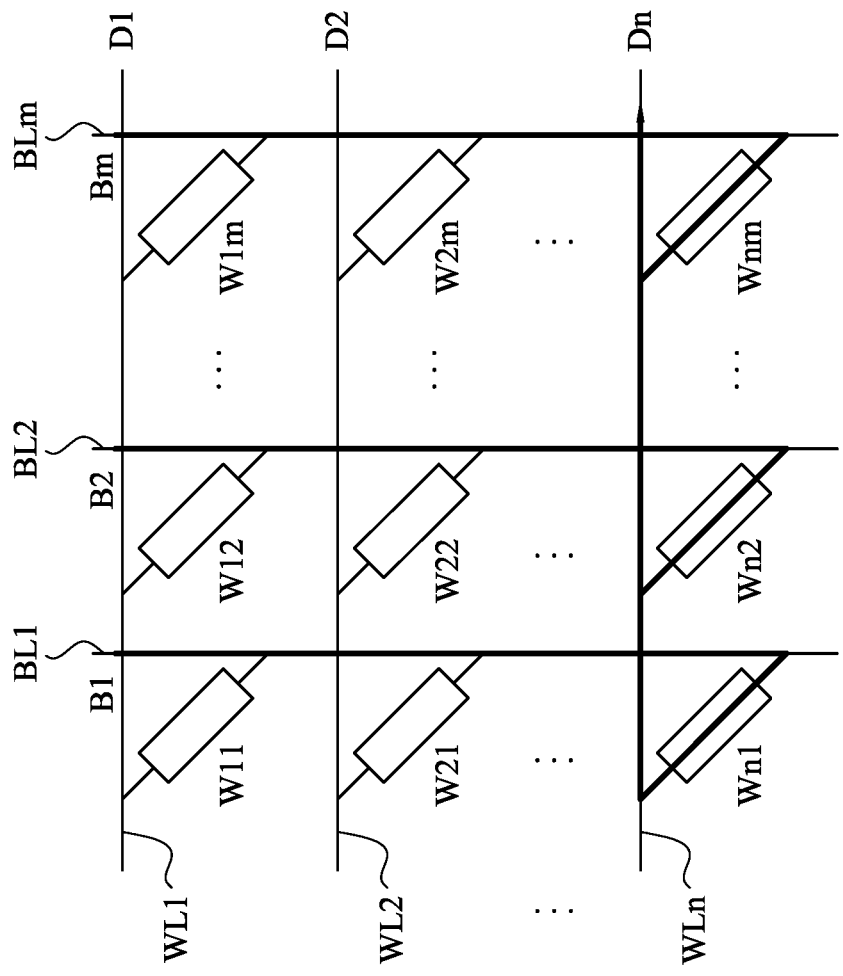
FIG. 2D is a schematic diagram of the internal structure and current path of a 2D memory array in accordance with some embodiments of the present disclosure.

In some embodiments, in addition to receiving neural network data through the word lines WL1-WLn and outputting neural network data through the bit lines BL1-BLm, the 2D memory array 111_1 can also receive neural network data through the bit lines BL1-BLm and output neural network data through word lines the WL1-WLn. Please refer to FIG. 2D. FIG. 2D is a schematic diagram of the internal structure and current path of the 2D memory array 111_1 in accordance with some embodiments of the present disclosure.

In the embodiment of FIG. 2D, the 2D memory array 111_1 receives the neural network data B1 through the bit line BL1, and generates a part of the neural network data D1 on the word line WL1 based on the neural network data B1 and the impedance W11 of the memory cell G11; receives the neural network data B2 through the bit line BL2, and generates another part of the neural network data D1 on the word line WL1 based on the neural network data B2 and the impedance W12 of the memory cell G12, and so on. Consequently, the inputs of the neural network data B1-Bm will generate m parts of the neural network data D1 on the word line WL1, and the sum of these m parts is the neural network data D1, and so on. Therefore, the neural network data Dn can be calculated based on the neural network data B1-Bm received by the bit lines BL1-BLm and the impedance of each neural network data along the path of word line WLn.

Therefore, similar to the embodiment of FIG. 2B, the relationship between the neural network data B1-Bm, the impedances W11-W1m, W21-W2m, ..., Wn1-Wnm and the neural network data D1-Dn can also be used to implement the calculation between two adjacent neural network layers of a neural network model (e.g., the neural network model in FIG. 2C). The calculation of the neural network data D1-Dn can be expressed as the following Formula 2:

$$Di = \sum_{j=1}^{m} (Bj * Wij).\qquad \text{Formula 2}$$

In conclusion, the 2D memory array 111_1 can store two different pieces of data in the same 2D memory array by receiving and outputting neural network data through word lines and bit lines respectively, and receiving and outputting neural network data through bit lines and word lines respectively.

Figure 3B:
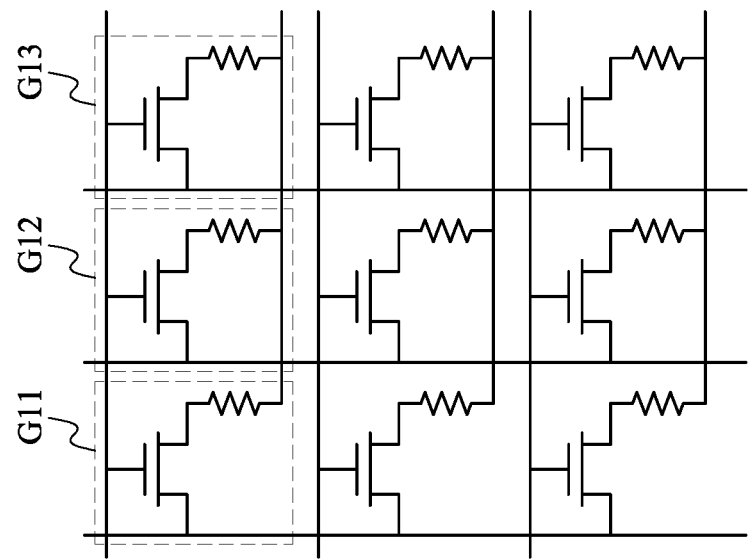
FIG. 3B is a circuit diagram of a 2D memory array in accordance with other embodiments of the present disclosure.
Figure 3A:
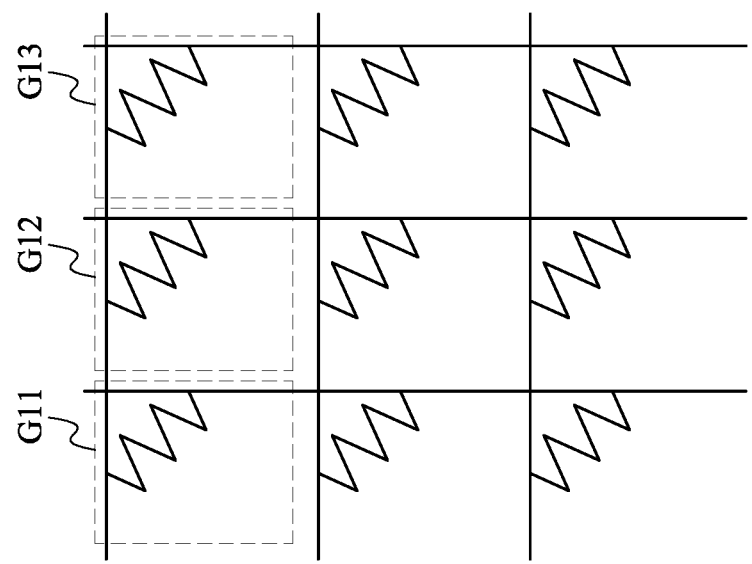
FIG. 3A is a circuit diagram of a 2D memory array in accordance with some embodiments of the present disclosure.
Figure 3C:
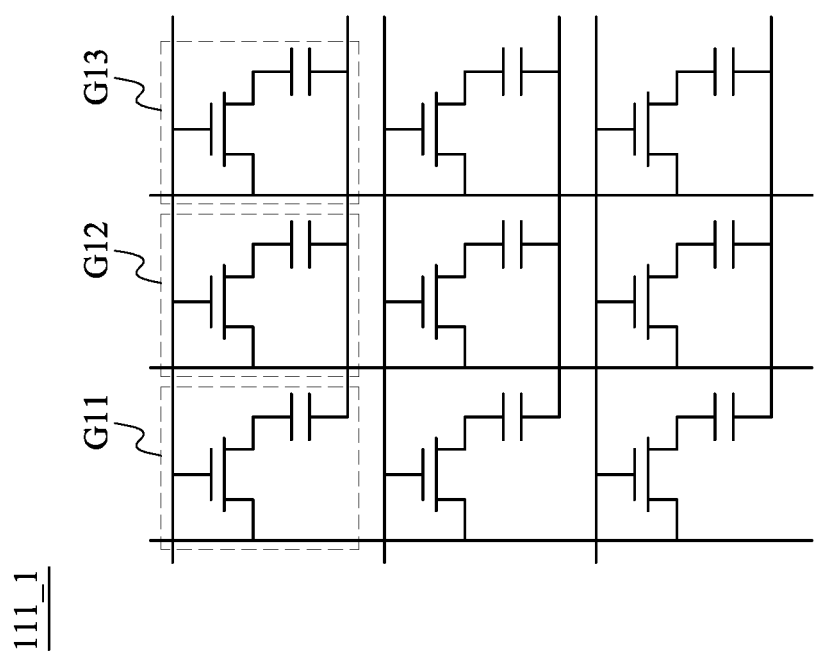
FIG. 3C is a circuit diagram of a 2D memory array in accordance with yet other embodiments of the present disclosure.

For the implementation of the memory cells G11-G1m, G21-G2m, ..., Gn1-Gnm, please refer to FIGS. 3A-3C. FIGS. 3A-3C are circuit diagrams of the 2D memory array 111_1 in accordance with various embodiments of the present disclosure.

In some embodiments, the memory cells G11-G1m, G21-G2m, ..., Gn1-Gnm can be connected by horizontal and vertical wires (e.g., word lines and bit lines), so as to form a cross-point type array. For example, in the embodiment of FIG. 3A, the memory cells G11-G13 and the memory cells G21-G23 and G31-G33 (not labeled for the sake of brevity) are respectively coupled to adjacent memory cells through the horizontal and vertical wires, and each of the memory cells (i.e., each cross point of the cross-point type array) is implemented with a circuit comprising a resistor.

In other embodiments, the memory cells G11-G1m, G21-G2m, Gn1-Gnm can also be connected by horizontal and vertical wires, and can further control their conduction status through additional wires, so as to form a NOR type array. For example, in the embodiment of FIG. 3B, the memory cells G11-G13 and the memory cells G21-G23 and G31-G33 (not labeled for the sake of brevity) are respectively coupled to adjacent memory cells through the horizontal and vertical wires, and each of the memory cells is implemented with a circuit comprising a resistor and a capacitor. In addition, the control terminals of memory cells on the same row of the memory array are connected to an additional line to control whether they are turned on or not.

Similar to FIG. 3B, in the embodiment of FIG. 3C, the memory cells G11-G13, G21-G23 and G31-G33 also form a NOR type array. The difference is that each memory cell in FIG. 3C is implemented with a circuit comprising an inductor and a capacitor.

It should be noted that the implementations of the memory cells G11-G13, G21-G23 and G31-G33 in FIGS. 2B-2D are only examples, and are not intended to limit the present disclosure. As long as the circuit structures of the memory cells meet the conditions of cross-point type array or NOR type array, other implementations of memory cells are within the scope of the present disclosure.

Figure 4A:
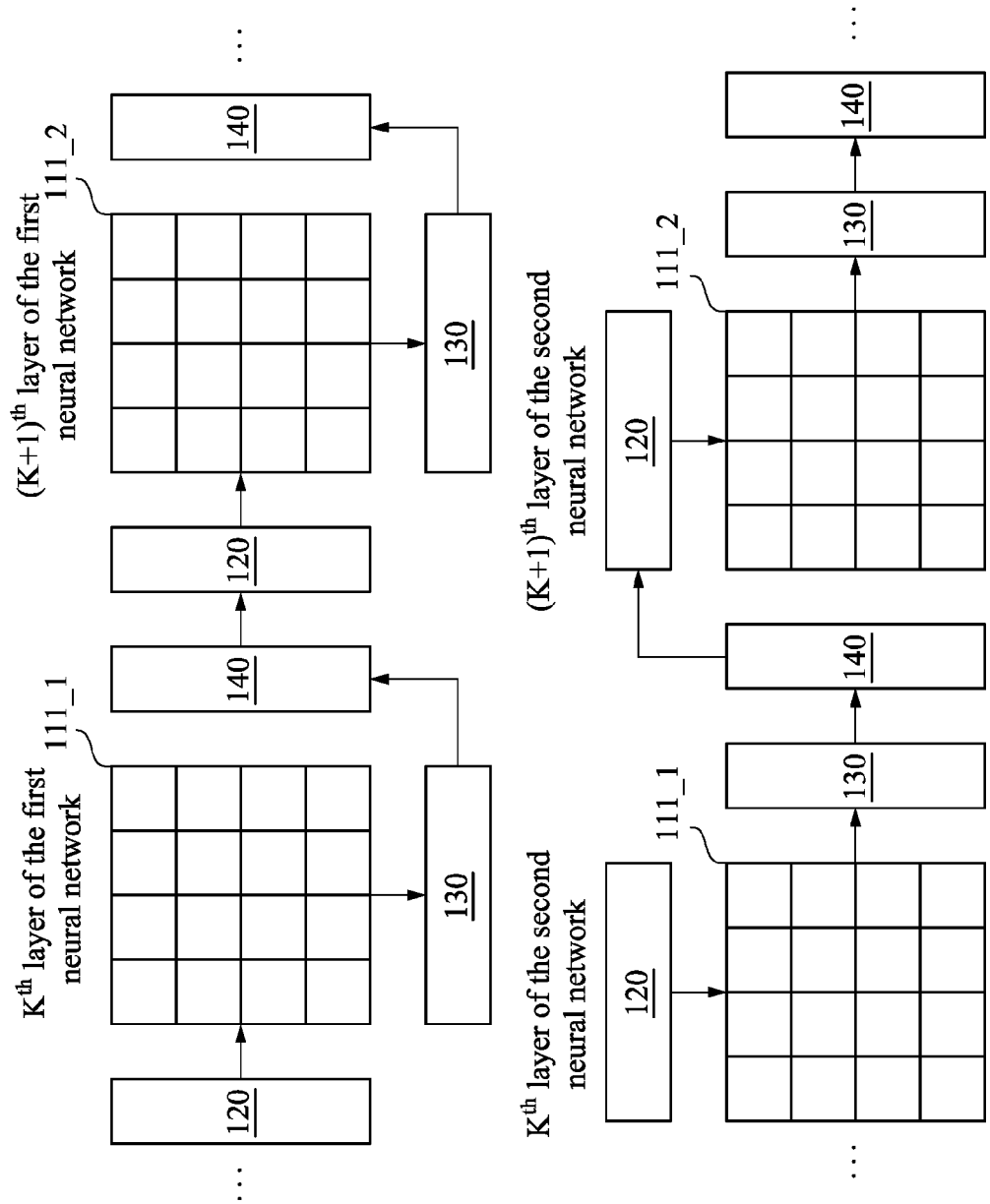
FIG. 4A is a schematic diagram of 2D memory arrays storing neural network data in accordance with some embodiments of the present disclosure.

FIG. 4A is a schematic diagram of the 2D memory arrays 111_1 and 111_2 storing neural network data in accordance with some embodiments of the present disclosure. It should be noted that for the sake of brevity of the figure, the word lines and bit lines connected to each 2D memory array are omitted in FIGS. 4A-4C and FIGS. 6A-6D. When the encoding circuit 120 is connected to the left or right side of a 2D memory array in the figure, it represents that the 2D memory array receives the neural network data through the word lines; when the encoding circuit 120 is connected to the upper or lower side of a 2D memory array in the figure, it represents that the 2D memory array receives the neural network data through the bit lines. When the sensing circuit 130 is connected to the left or right side of a 2D memory array in the figure, it represents that the 2D memory array transmits the neural network data through the word lines; when the sensing circuit 130 is connected to the upper or lower side of a 2D memory array in the figure, it represents that the 2D memory array transmits the neural network data through the bit lines.

In the embodiment of FIG. 4A, the 2D memory array 111_1 is coupled to the 2D memory array 111_2 through a set of encoding circuit 120, sensing circuit 130 and processing circuit 140, so as to store the neural network data related to the $K^{th}$ neural network layer of a first neural network model. Specifically, after the encoding circuit 120 inputs the neural network data related to the $K^{th}$ neural network layer of the first neural network model into the 2D memory array 111_1, with the weighting and summing by the 2D memory array 111_1, the sensing circuit 130 can calculate the neural network data related to the $(K+1)^{th}$ neural network layer of the first neural network model, and the processing circuit 140 uses it as the neural network data input to the 2D memory array 111_2 for subsequent calculations.

Similarly, the 2D memory array 111_2 is also coupled to the 2D memory array 111_3 through another set of encoding circuit 120, sensing circuit 130 and processing circuit 140, and calculates the neural network data related to the $(K+2)^{th}$ neural network layer of the first neural network model in a manner similar to the 2D memory array 111_1, thereby storing the neural network data related to the $(K+1)^{th}$ neural network layer of the first neural network model.

In addition, the 2D memory array 111_1 is further coupled to the 2D memory array 111_2 through another set of encoding circuit 120, sensing circuit 130 and processing circuit 140, so as to store the neural network data related to the $K^{th}$ neural network layer of a second neural network model; the 2D memory array 111_2 is further coupled to the 2D memory array 111_3 through yet another set of encoding circuit 120, sensing circuit 130 and processing circuit 140, so as to store the neural network data related to the $(K+1)^{th}$ neural network layer of the second neural network model.

Therefore, each of the 2D memory arrays can store two sets of data through two connection methods. The connection method and data transmission method of the 2D memory arrays 111_3-111_p are similar to the 2D memory arrays 111_1 and 111_2, and will not be repeated here.

In some embodiments, the 2D memory arrays 111_1-111_p receive the neural network data related to the first neural network model through the word lines, and transmit the neural network data related to the first neural network model through the bit lines (as shown in the upper part of FIG. 4A), so as to store the first dataset. In addition, the 2D memory arrays 111_1-111_p further receive the neural network data related to the second neural network model through the bit lines, and transmit the neural network data related to the second neural network model through the word lines (as shown in the lower part of FIG. 4A), so as to store the second dataset.

Figure 4B:
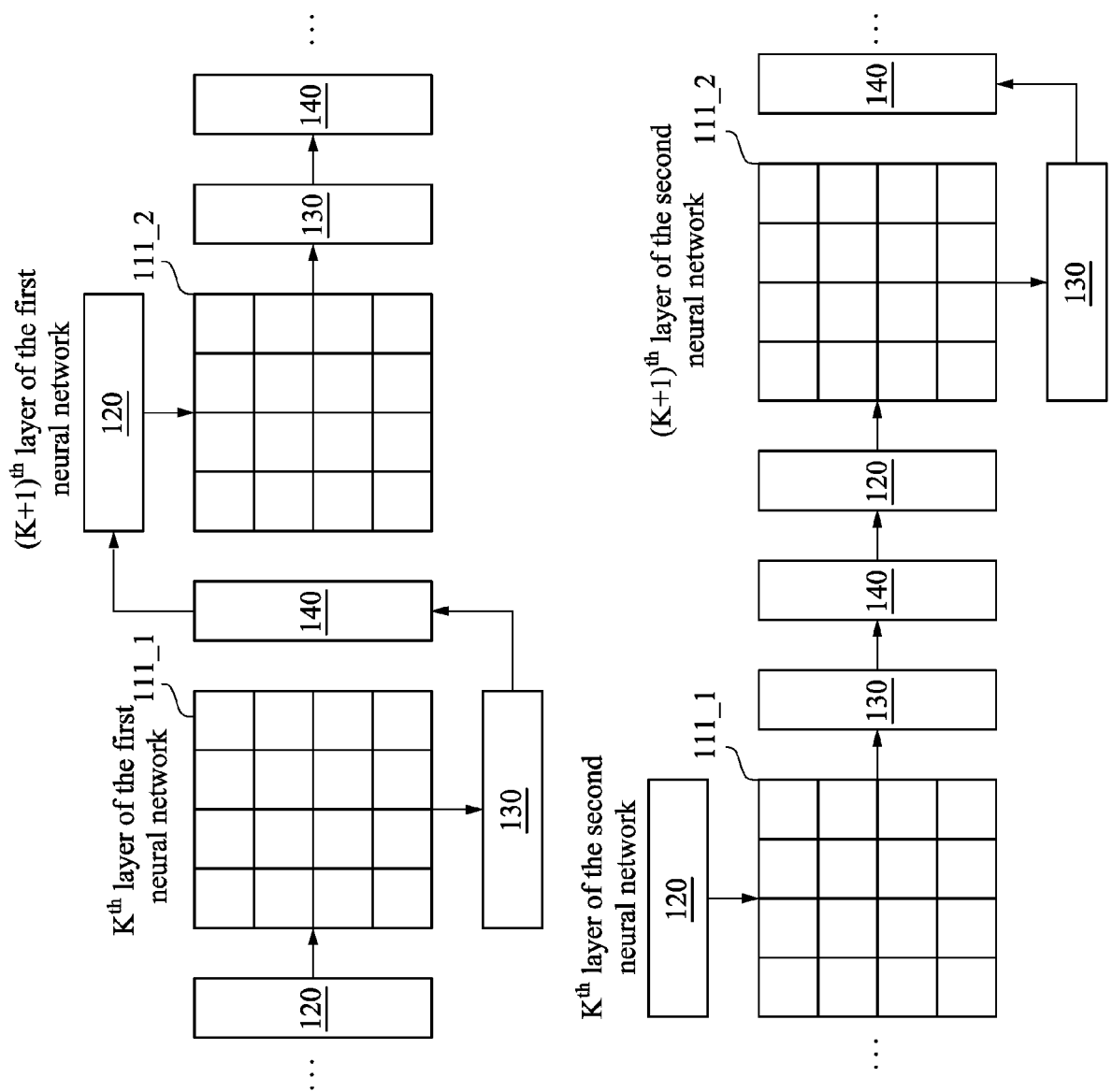
FIG. 4B is a schematic diagram of 2D memory arrays storing neural network data in accordance with other embodiments of the present disclosure.

FIG. 4B is a schematic diagram of the 2D memory arrays 111_1 and 111_2 storing neural network data in accordance with other embodiments of the present disclosure. Similar to FIG. 4A, the 2D memory array 111_1 in FIG. 4B is also configured to store the neural network data related to the $K^{th}$ neural network layer of the first neural network model and the neural network data related to the $K^{th}$ neural network layer of the second neural network model, and the 2D memory array 111_2 is also configured to store the neural network data related to the $(K+1)^{th}$ neural network layer of the first neural network model and the neural network data related to the $(K+1)^{th}$ neural network layer of the second neural network model.

Different from FIG. 4A, in the embodiment of FIG. 4B, a part of the 2D memory arrays 111_1-111_p can receive the neural network data related to the first neural network model through the word lines, and then transmit the neural network data related to the first neural network model through the bit lines. The other part of the 2D memory arrays 111_1-111_p can receive the neural network data related to the first neural network model through the bit lines, and then transmit the neural network data related to the first neural network model through the word lines. In this way, the 2D memory arrays 111_1-111_p can store the first dataset.

For example, as shown in the upper part of FIG. 4B, the 2D memory array 111_1 receives the neural network data related to the $K^{th}$ neural network layer of the first neural network model through the word lines, and transmits the neural network data related to the $(K+1)^{th}$ neural network layer of the first neural network model through the bit lines, while the 2D memory array 111_2 receives the neural network data related to the $(K+1)^{th}$ neural network layer of the first neural network model through the bit lines, and transmits the neural network data related to the $(K+2)^{th}$ neural network layer of the first neural network model through the word lines.

Therefore, when the 2D memory arrays 111_1-111_p store the neural network data related to the second neural network model (i.e., the second dataset), a part of the 2D memory arrays can receive the neural network data through the bit lines and transmit the neural network data through the word lines, and the other part of the 2D memory arrays can receive the neural network data through the word lines and transmit the neural network data through the bit lines.

Continuing with the embodiment shown in FIG. 4B, the 2D memory array 111_1 receives the neural network data related to the $K^{th}$ neural network layer of the second neural network model through the bit lines, and then transmits the neural network data related to the $(K+1)^{th}$ neural network layer of the second neural network model through the word lines. The 2D memory array 111_2 receives the neural network data related to the $(K+1)^{th}$ neural network layer of the second neural network model through the word lines, and then transmits the neural network data related to the $(K+2)^{th}$ neural network layer of the second neural network model through the bit lines.

It should be noted that although the 2D memory arrays 111_1-111_p shown in FIGS. 4A-4B and described in above paragraphs are configured to store the neural network data related to the same neural network layer of two neural network models, the present disclosure is not limited thereto. In some embodiments, the 2D memory arrays 111_1-111_p can store the neural network data related to different neural network layers of two neural network models. For example, the 2D memory array 111_1 can store the neural network data related to the first neural network layer of the first neural network model and the neural network data related to the fifth neural network layer of the second neural network model.

In addition, the 2D memory arrays 111_1-111_p in the present disclosure are not limited to storing the neural network data related to two neural network models. In some embodiments, each of the 2D memory arrays is configured to store the neural network data related to two adjacent neural network layers of a neural network model.

Figure 4C:
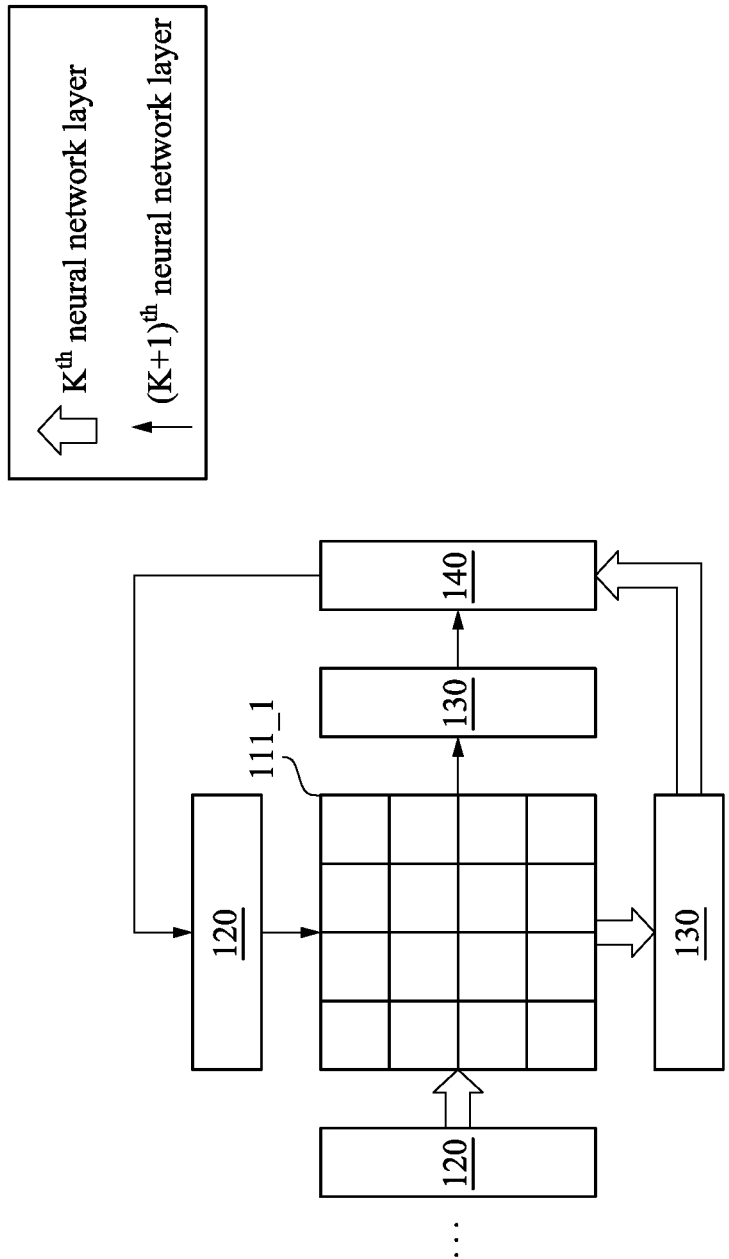
FIG. 4C is a schematic diagram of a 2D memory array storing neural network data in accordance with yet other embodiments of the present disclosure.

Please refer to FIG. 4C. FIG. 4C is a schematic diagram of the 2D memory array 111_1 storing neural network data in accordance with yet other embodiments of the present disclosure.

In the embodiment of FIG. 4C, first, through the first set of encoding circuit 120 and sensing circuit 130, the 2D memory array 111_1 receives the neural network data related to the $K^{th}$ neural network layer of the first neural network model through the word lines, and then transmits the neural network data related to the $(K+1)^{th}$ neural network layer through the bit lines. Next, the processing circuit 140 transfers the neural network data related to the $(K+1)^{th}$ neural network layer to the second set of encoding circuit 120 and sensing circuit 130 of the 2D memory array 111_1, so that the 2D memory array 111_1 can further receive the neural network data related to the $(K+1)^{th}$ neural network layer through the bit lines, and then transmit the neural network data related to the $(K+2)^{th}$ neural network layer to the 2D memory array 111_2 through the word lines. In this way, this configuration can enable a 2D memory array to implement the function of storing the neural network data related to two adjacent neural network layers of a neural network model.

It should be noted that although the 2D memory array 111_1 in FIG. 4C is shown as being configured to receive the neural network data through the word lines and transmit the neural network data through the bit lines first (i.e., the first dataset), and then receive the neural network data through the bit lines and transmit the neural network data through the word lines (i.e., the second dataset) the present disclosure is not limited thereto. In some embodiments, a part of the 2D memory arrays 111_1-111_p can receive and transmit the first dataset through the word lines and the bit lines respectively first, and then receive and transmit the second dataset through the bit lines and the word lines respectively; and the other part of the 2D memory arrays 111_1-111_p can receive and transmit the first dataset through the bit lines and the word lines respectively first, and then receive and transmit the second dataset through the word lines and the bit lines respectively.

FIG. 5 is a schematic diagram of the relationship between the 2D memory array 111_1 and sub-arrays 111_1A-111_1J in accordance with some embodiments of the present disclosure. In some embodiments, the 2D memory array 111_1 (and other 2D memory arrays in the 3D memory array 110) can be divided into a plurality of sub-arrays with the same size, so as to store the neural network data.

In some embodiments, the sum of the sizes of the sub-arrays may be equal to the size of the divided 2D memory array. For example, the sub-arrays 111_1A-111_1D are all 4×4 arrays, and the sum of these arrays is the same as the 2D memory array 111_1 with 8×8 size.

In other embodiments, the sum of the sizes of the sub-arrays may be larger than the size of the divided 2D memory array. For example, the sub-arrays 111_1E-111_1J are all 3×5 arrays, and the sum of these arrays is greater than the 2D memory array 111_1 with 8×8 size. At this case, the voltages received by the extra rows and columns in the array will be set to 0.

Figure 6A:
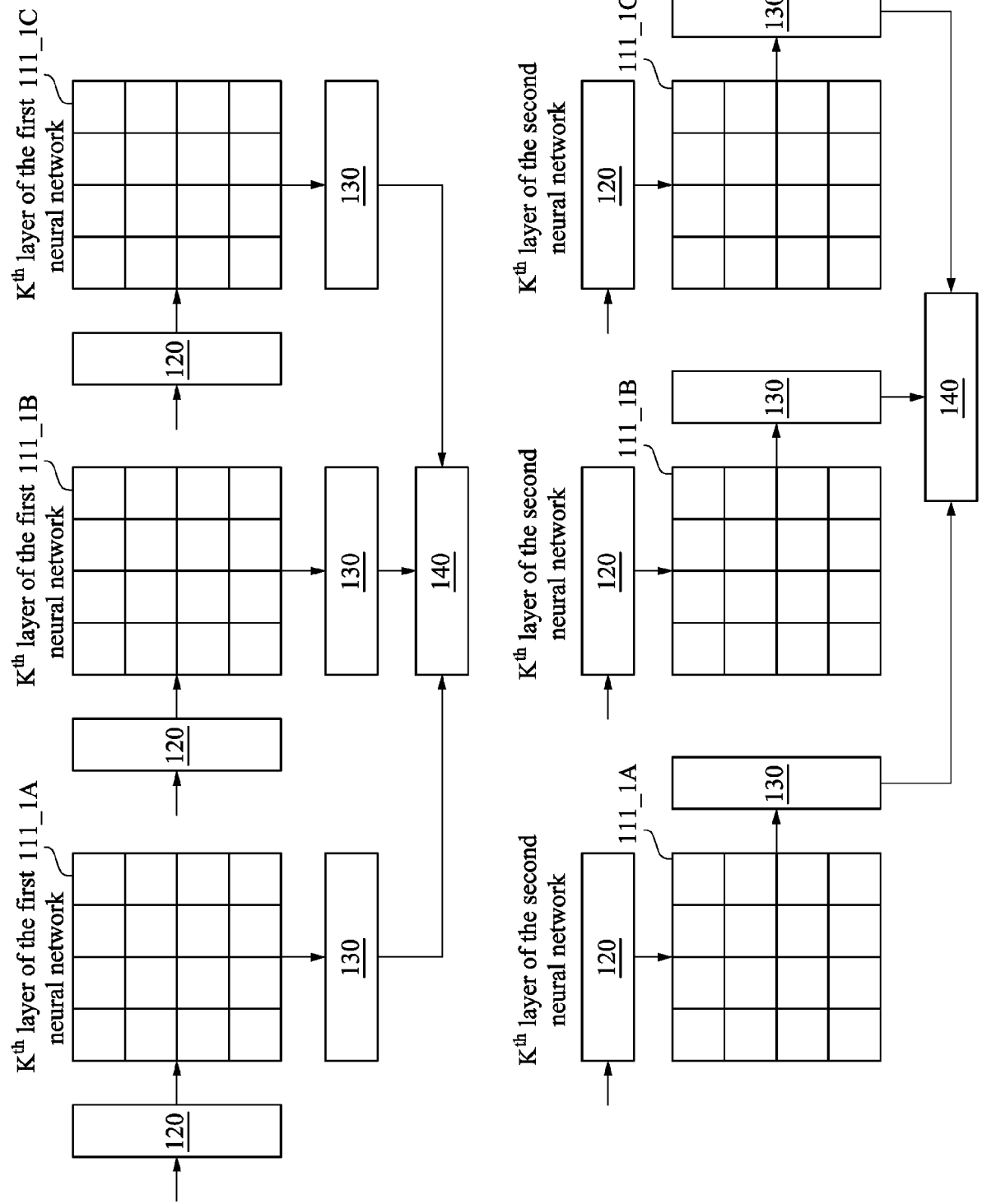
FIG. 6A is a schematic diagram of sub-arrays storing neural network data in accordance with some embodiments of the present disclosure.

FIG. 6A is a schematic diagram of the sub-arrays 111_1A-111_1C storing neural network data in accordance with some embodiments of the present disclosure. In some embodiments, the sub-arrays 111_1A-111_1C in FIG. 6A are configured to jointly implement the 2D memory array 111_1 in FIG. 2A.

Specifically, each of the sub-arrays 111_1A-111_1C is connected to a set of encoding circuit 120 and sensing circuit 130, and the three sensing circuits 130 are connected to a processing circuit 140, so as to sum up the neural network data output by the three sensing circuits 130 and obtain the neural network data related to the $K^{th}$ neural network layer of the first neural network model. In addition, each of the sub-arrays 111_1A-111_1C is further connected to another set of encoding circuit 120 and sensing circuit 130, and the three sensing circuits 130 are connected to another processing circuit 140, so as to sum up the neural network data output by the three sensing circuits 130 and obtain the neural network data related to the $K^{th}$ neural network layer of the second neural network model.

Similar to the 2D memory arrays 111_1-111_p in FIG. 2A, the sub-arrays 111_1A-111_1C in FIG. 6A receive the neural network data related to the first neural network model through the word lines, and transmit the neural network data related to the first neural network model through the bit lines (as shown in the upper part of FIG. 6A), so as to store the first dataset. In addition, the sub-arrays 111_1A~111_1C further receive the neural network data related to the second neural network model through the bit lines, and transmit the neural network data related to the second neural network model through the word lines (as shown in the lower part of FIG. 6A), so as to store the second dataset.

Figure 6B:
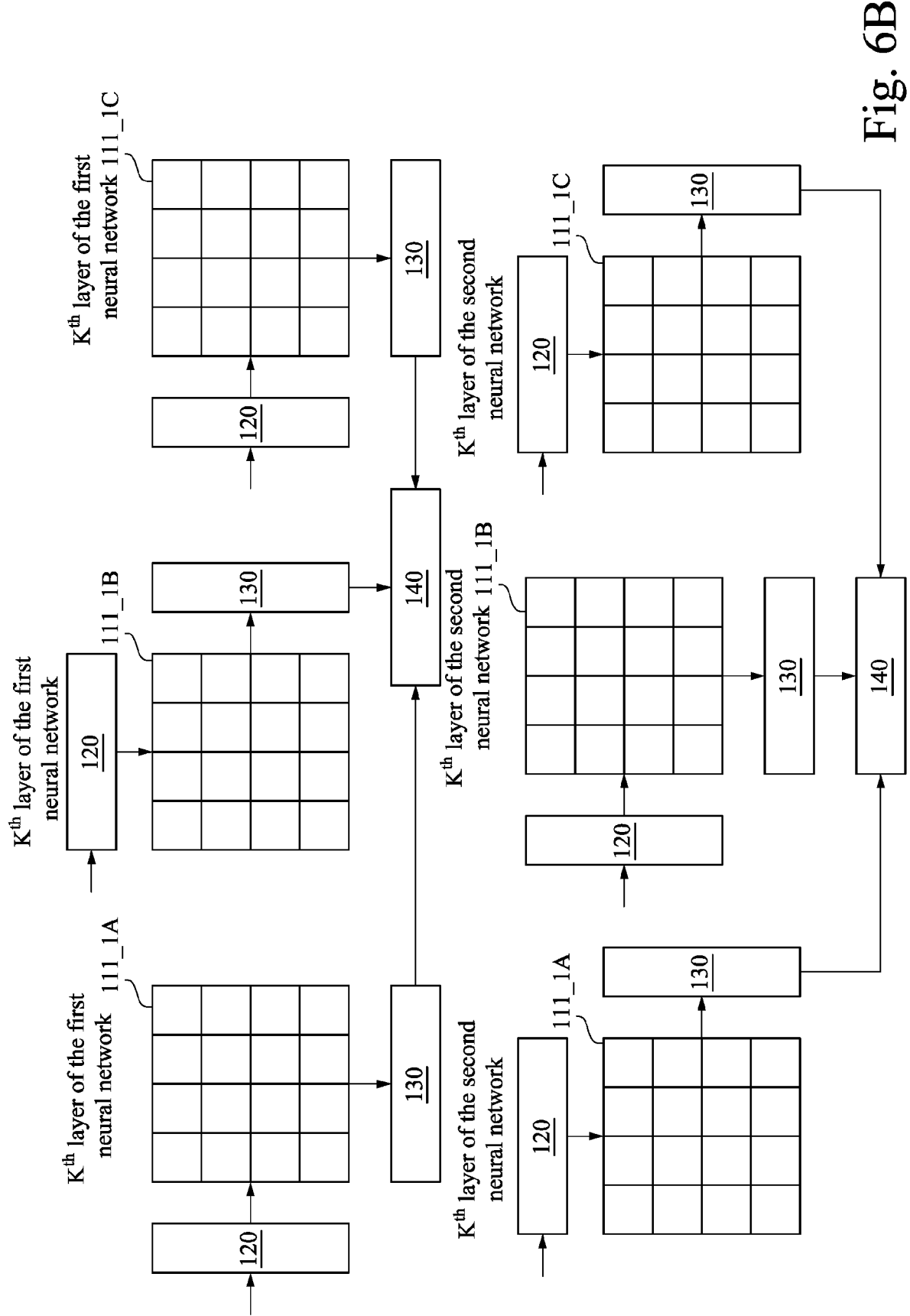
FIG. 6B is a schematic diagram of sub-arrays storing neural network data in accordance with other embodiments of the present disclosure.

FIG. 6B is a schematic diagram of the sub-arrays 111_1A-111_1C storing neural network data in accordance with other embodiments of the present disclosure. In some embodiments, the sub-arrays 111_1A-111_1C in FIG. 6B are configured to jointly implement the 2D memory array 111_1 in FIG. 2B.

Specifically, similar to FIG. 4B, a part of the sub-arrays 111_1A-111_1C can receive the neural network data related to the first neural network model through the word lines, and then transmit the neural network data related to the first neural network model through the bit lines; and the other part of the sub-arrays 111_1A-111_1C can receive the neural network data related to the first neural network model through the bit lines, and then transmit the neural network data related to the first neural network model through the word lines, so as to jointly store the first dataset (as shown in the upper part of FIG. 6B). The method of storing the second dataset in the sub-arrays 111_1A-111_1C is similar to which in FIG. 4B, and will not be repeated here.

Figure 6C:
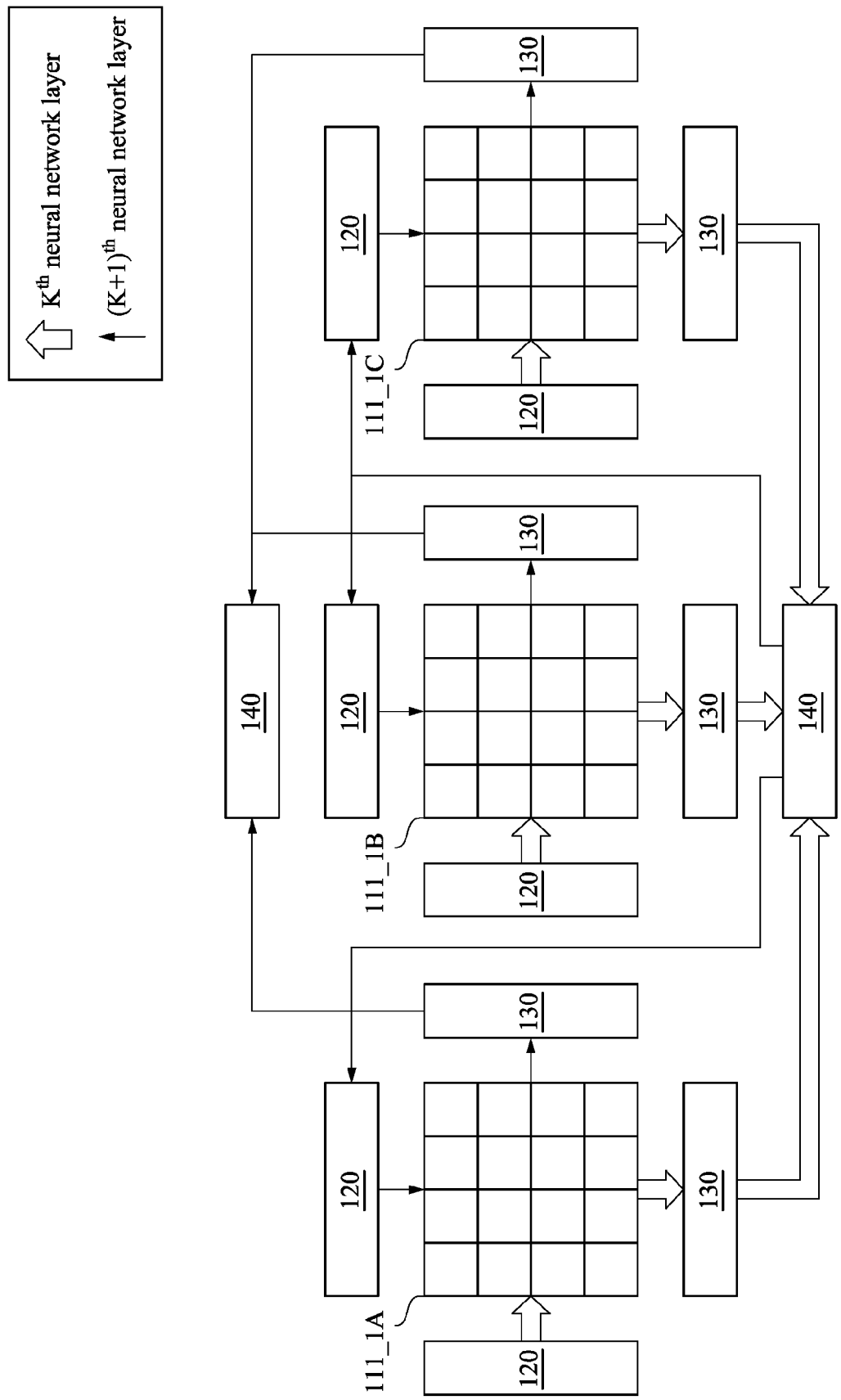
FIG. 6C is a schematic diagram of sub-arrays storing neural network data in accordance with yet other embodiments of the present disclosure.

FIG. 6C is a schematic diagram of the sub-arrays 111_1A-111_1C storing neural network data in accordance with yet other embodiments of the present disclosure. In some embodiments, the sub-arrays 111_1A~111_1C in FIG. 6C are configured to jointly implement the 2D memory array 111_1 in FIG. 2C.

Specifically, similar to FIG. 4C, the sub-arrays 111_1A-111_1C are configured to store the neural network data related to two adjacent neural network layers of a neural network model. First, through three encoding circuits 120 and three sensing circuits 130, the sub-arrays 111_1A-111_1C receive the neural network data related to the $K^{th}$ neural network layer through the word lines, and then transmit parts of the neural network data related to the $(K+1)^{th}$ neural network layer through the bit lines. Next, the processing circuit 140 sums up the parts of the neural network data transmitted by the three sensing circuits 130 to obtain the neural network data related to the $(K+1)^{th}$ neural network layer, and transmits it to other three encoding circuits 120 and other three sensing circuits 130. Therefore, the sub-arrays 111_1A-111_1C can further receive the neural network data related to the $(K+1)^{th}$ neural network layer through the bit lines, and then transmit parts of the neural network data related to the $(K+2)^{th}$ neural network layer to another processing circuit 140 through the word lines, so as to obtain the neural network data related to the $(K+2)^{th}$ neural network layer.

In addition, similar to FIG. 4C, in some embodiments, a part of the sub-arrays 111_1A-111_1C can receive and transmit the first dataset through the word lines and the bit lines respectively first, and then receive and transmit the second dataset through the bit lines and the word lines respectively; and the other part of the sub-arrays 111_1A-111_1C can receive and transmit the first dataset through the bit lines and the word lines respectively first, and then receive and transmit the second dataset through the word lines and the bit lines respectively.

Figure 6D:
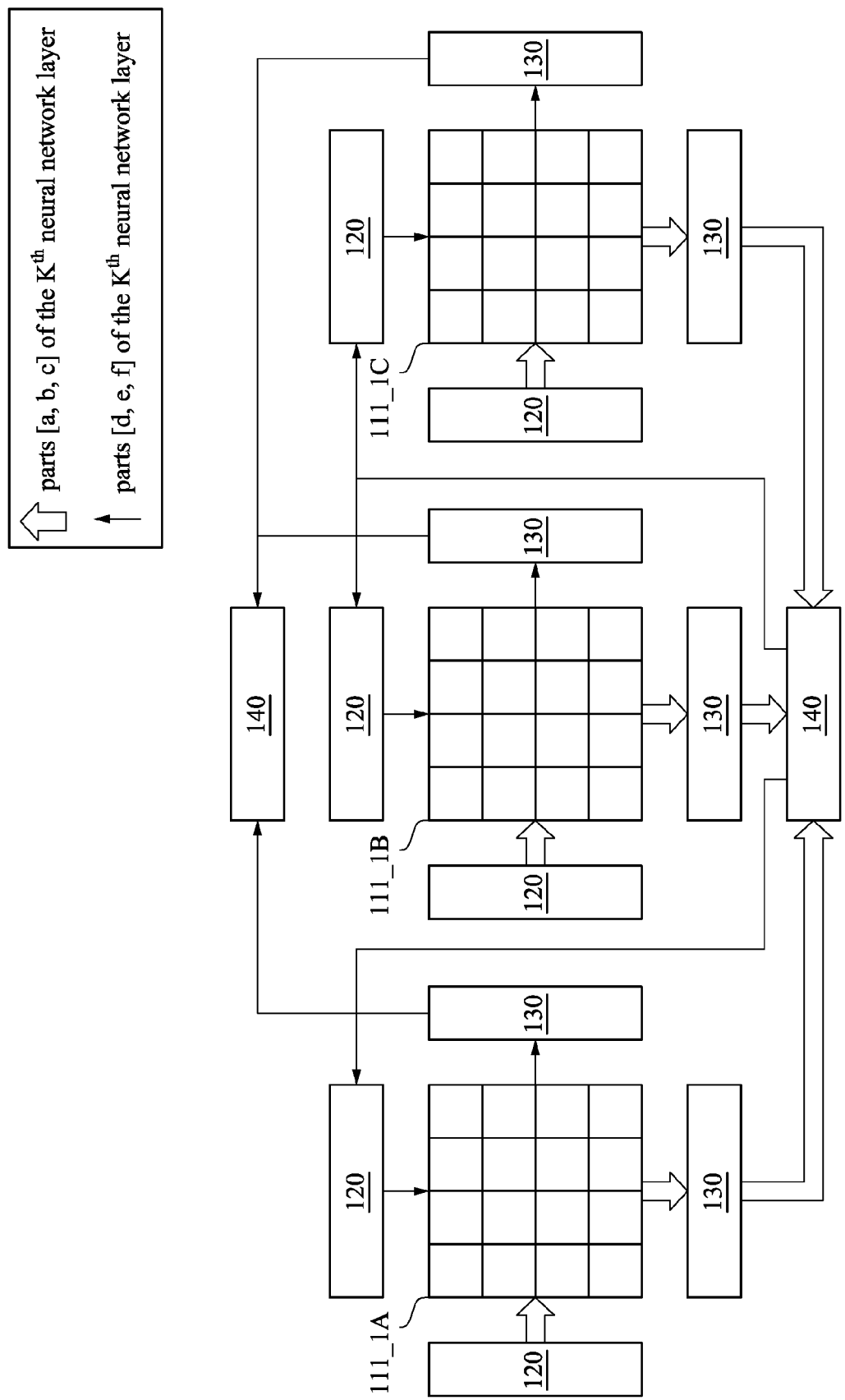
FIG. 6D is a schematic diagram of sub-arrays storing neural network data in accordance with yet other embodiments of the present disclosure.

FIG. 6D is a schematic diagram of the sub-arrays 111_1A-111_1C storing neural network data in accordance with yet other embodiments of the present disclosure. FIG. 6D is similar to FIG. 6C. The difference is that the sub-arrays 111_1A-111_1C in FIG. 6D can be configured to store the neural network data related to two parts of a neural network layer of a neural network model. In other words, the sub-arrays 111_1A-111_1C in FIG. 6D take the parts [a, b, c] of the $K^{th}$ neural network layer as the first dataset of the neural network data, and take the parts [d, e, f] of the $K^{th}$ neural network layer as the second dataset of the neural network data, so as to jointly store the neural network data related to the $K^{th}$ neural network layer.

With the configurations of the 3D memory device 100 provided in the present disclosure, the function of storing two sets of neural network data can be implemented by inputting two sets of data through word lines/bit lines and outputting them through bit lines/word lines respectively, thereby improving the storage capacity of the 3D memory device 100.

The above are preferred embodiments of the present disclosure. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A three-dimensional (3D) memory device, comprising:
a plurality of word lines;
a plurality of bit lines;
a 3D memory array, comprising a plurality of two-dimensional (2D) memory arrays, and configured to store a first neural network data, a second neural network data, a third neural network data and a fourth neural network data related to at least one neural network model,
wherein each of the plurality of 2D memory arrays is coupled to the plurality of word lines and the plurality of bit lines, configured to receive a first input voltage and output a first output current, and configured to receive a second input voltage and output a second output current;
a plurality of encoding circuits, respectively coupled to the plurality of 2D memory arrays, and configured to generate the first input voltage and the second input voltage respectively based on the first neural network data and the second neural network data; and
a plurality of sensing circuits, respectively coupled to the plurality of 2D memory arrays, and configured to generate the third neural network data and the fourth neural network data respectively based on the first output current and the second output current.

2. The 3D memory device of claim 1, wherein the first neural network data is related to a $K^{th}$ neural network layer of a first neural network model of the at least one neural network model, the third neural network data is related to a $(K+1)^{th}$ neural network layer of the first neural network model, and
the second neural network data is related to a $M^{th}$ neural network layer of a second neural network model of the at least one neural network model, the fourth neural network data is related to a $(M+1)^{th}$ neural network layer of the second neural network model,
wherein the first neural network model is different from the second neural network model, and M and K are positive integers.

3. The 3D memory device of claim 2, wherein a first 2D memory array of the plurality of 2D memory arrays is coupled to two of the plurality of sensing circuits, a second 2D memory array of the plurality of 2D memory arrays is coupled to two of the plurality of encoding circuits, and
the two of the plurality of sensing circuits are respectively coupled to the two of the plurality of encoding circuits, and are respectively configured to:
input the third neural network data of the first 2D memory array to the second 2D memory array as the first neural network data of the second 2D memory array; and
input the fourth neural network data of the first 2D memory array to the second 2D memory array as the second neural network data of the second 2D memory array.

4. The 3D memory device of claim 3, wherein the plurality of 2D memory arrays receive the first neural network data through the plurality of word lines, and receive the second neural network data through the plurality of bit lines, and
the plurality of 2D memory arrays transmit the third neural network data through the plurality of bit lines, and transmit the fourth neural network data through the plurality of word lines.

5. The 3D memory device of claim 3, wherein a part of the plurality of 2D memory arrays receive the first neural network data through the plurality of word lines, receive the second neural network data through the plurality of bit lines, transmit the third neural network data through the plurality of bit lines, and transmit the fourth neural network data through the plurality of word lines, and
the other part of the plurality of 2D memory arrays receive the first neural network data through the plurality of bit lines, receive the second neural network data through the plurality of word lines, transmit the third neural network data through the plurality of word lines, and transmit the fourth neural network data through the plurality of bit lines.

6. The 3D memory device of claim 1, wherein the first neural network data is related to a $K^{th}$ neural network layer of a first neural network model of the at least one neural network model, the second neural network data is same to the third neural network data and is related to a $(K+1)^{th}$ neural network layer of the first neural network model, and the fourth neural network data is related to a $(K+2)^{th}$ neural network layer of the first neural network model, wherein K is a positive integer.

7. The 3D memory device of claim 6, wherein a first 2D memory array of the plurality of 2D memory arrays is coupled to a first sensing circuit and a second sensing circuit of the plurality of sensing circuits, and is coupled to a first encoding circuit and a second encoding circuit of the plurality of encoding circuits,
wherein the first encoding circuit is configured to receive the first neural network data,
the first sensing circuit is coupled to the second encoding circuit, and is configured to transmit the third neural network data to the first 2D memory array as the second neural network data, and
the second sensing circuit is configured to transmit the fourth neural network data to a second 2D memory array of the plurality of 2D memory arrays as the first neural network data of the second 2D memory array.

8. The 3D memory device of claim 7, wherein the plurality of 2D memory arrays receive the first neural network data through the plurality of word lines, and receive the second neural network data through the plurality of bit lines, and
the plurality of 2D memory arrays transmit the third neural network data through the plurality of bit lines, and transmit the fourth neural network data through the plurality of word lines.

9. The 3D memory device of claim 7, wherein a part of the plurality of 2D memory arrays receive the first neural network data through the plurality of word lines, receive the second neural network data through the plurality of bit lines, transmit the third neural network data through the plurality of bit lines, and transmit the fourth neural network data through the plurality of word lines, and the other part of the plurality of 2D memory arrays receive the first neural network data through the plurality of bit lines, receive the second neural network data through the plurality of word lines, transmit the third neural network data through the plurality of word lines, and transmit the fourth neural network data through the plurality of bit lines.

10. A three-dimensional (3D) memory device, comprising:
a plurality of word lines;
a plurality of bit lines;
a 3D memory array, comprising a plurality of two-dimensional (2D) memory arrays, wherein each of the plurality of 2D memory arrays comprises a plurality of sub-arrays with the same size, and is configured to store a first neural network data, a second neural network data, a third neural network data and a fourth neural network data related to at least one neural network model,
wherein the plurality of sub-arrays are coupled to the plurality of word lines and the plurality of bit lines, configured to receive a plurality of first input voltages and output a plurality of first output currents, and configured to receive a plurality of second input voltages and output a plurality of second output currents;
a plurality of encoding circuits, respectively coupled to the plurality of sub-arrays, and configured to generate the plurality of first input voltages and the plurality of second input voltages respectively based on the first neural network data and the second neural network data; and
a plurality of sensing circuits, respectively coupled to the plurality of sub-arrays, and configured to generate the third neural network data and the fourth neural network data respectively based on the plurality of first output currents and the plurality of second output currents.

11. The 3D memory device of claim 10, wherein the first neural network data is related to a $K^{th}$ neural network layer of a first neural network model of the at least one neural network model, the third neural network data is related to a $(K+1)^{th}$ neural network layer of the first neural network model, and
the second neural network data is related to a $M^{th}$ neural network layer of a second neural network model of the at least one neural network model, the fourth neural network data is related to a $(M+1)^{th}$ neural network layer of the second neural network model,
wherein the first neural network model is different from the second neural network model, and M and K are positive integers.

12. The 3D memory device of claim 11, wherein each of a plurality of first sub-arrays of the plurality of sub-arrays is coupled to two of the plurality of sensing circuits, each of a plurality of second sub-arrays of the plurality of sub-arrays is coupled to two of the plurality of encoding circuits, and
the two of the plurality of sensing circuits that coupled to the plurality of first sub-arrays are coupled to the two of the plurality of encoding circuits that coupled to the plurality of second sub-arrays, and are respectively configured to:

input the third neural network data of the plurality of first sub-arrays to the plurality of second sub-arrays as the first neural network data of the plurality of second sub-arrays; and
input the fourth neural network data of the plurality of first sub-arrays to the plurality of second sub-arrays as the second neural network data of the plurality of second sub-arrays.

13. The 3D memory device of claim 12, wherein the plurality of sub-arrays receive the first neural network data through the plurality of word lines, and receive the second neural network data through the plurality of bit lines, and
the plurality of sub-arrays transmit the third neural network data through the plurality of bit lines, and transmit the fourth neural network data through the plurality of word lines.

14. The 3D memory device of claim 12, wherein a part of the plurality of sub-arrays receive the first neural network data through the plurality of word lines, receive the second neural network data through the plurality of bit lines, transmit the third neural network data through the plurality of bit lines, and transmit the fourth neural network data through the plurality of word lines, and
the other part of the plurality of sub-arrays receive the first neural network data through the plurality of bit lines, receive the second neural network data through the plurality of word lines, transmit the third neural network data through the plurality of word lines, and transmit the fourth neural network data through the plurality of bit lines.

15. The 3D memory device of claim 10, wherein the first neural network data is related to a $K^{th}$ neural network layer of a first neural network model of the at least one neural network model, the second neural network data is same to the third neural network data and is related to a $(K+1)^{th}$ neural network layer of the first neural network model, and the fourth neural network data is related to a $(K+2)^{th}$ neural network layer of the first neural network model, wherein K is a positive integer.

16. The 3D memory device of claim 15, wherein a plurality of first sub-arrays of the plurality of sub-arrays are coupled to a plurality of first sensing circuits and a plurality of second sensing circuits of the plurality of sensing circuits, and are coupled to a plurality of first encoding circuits and a plurality of second encoding circuits of the plurality of encoding circuits,
wherein the plurality of first encoding circuits are configured to receive the first neural network data,
the plurality of first sensing circuits are coupled to the plurality of second encoding circuits, and are configured to transmit the third neural network data to the plurality of first sub-arrays as the second neural network data, and
the plurality of second sensing circuits are configured to transmit the fourth neural network data to a plurality of second sub-arrays of the plurality of sub-arrays as the first neural network data of the plurality of second sub-arrays.

17. The 3D memory device of claim 16, wherein the plurality of sub-arrays receive the first neural network data through the plurality of word lines, and receive the second neural network data through the plurality of bit lines, and
the plurality of sub-arrays transmit the third neural network data through the plurality of bit lines, and transmit the fourth neural network data through the plurality of word lines.

18. The 3D memory device of claim 16, wherein a part of the plurality of sub-arrays receive the first neural network data through the plurality of word lines, receive the second neural network data through the plurality of bit lines, transmit the third neural network data through the plurality of bit lines, and transmit the fourth neural network data through the plurality of word lines, and the other part of the plurality of sub-arrays receive the first neural network data through the plurality of bit lines, receive the second neural network data through the plurality of word lines, transmit the third neural network data through the plurality of word lines, and transmit the fourth neural network data through the plurality of bit lines.

19. The 3D memory device of claim 10, wherein the first neural network data, the second neural network data, the third neural network data and the fourth neural network data are different from each other, and are related to the same one neural network layer of one of the at least one neural network model.

20. The 3D memory device of claim 19, wherein the plurality of sub-arrays receive the first neural network data through the plurality of word lines, and receive the second neural network data through the plurality of bit lines, and the plurality of sub-arrays transmit the third neural network data through the plurality of bit lines, and transmit the fourth neural network data through the plurality of word lines.

\* \* \* \* \*